United States Patent [19]

Jackson

[11] 4,413,551

[45] Nov. 8, 1983

[54] VENTILATOR GRILL

[75] Inventor: Alan S. Jackson, Benfleet, England

[73] Assignee: Ford Motor Company, Dearborn, Mich.

[21] Appl. No.: 317,352

[22] Filed: Nov. 2, 1981

[51] Int. Cl.³ .............................................. F24F 13/08
[52] U.S. Cl. ........................................ 98/40 V; 98/2;
98/101; 98/40 N; 239/553; 239/589
[58] Field of Search ............. 98/2, 40 R, 40 V, 40 N,
98/101, 103, 108; 239/553, 557, 589

[56] References Cited

U.S. PATENT DOCUMENTS 2,807,992  10/1957  Ehman ................................. 98/40 N
3,232,538  2/1966  Hammon ......................... 239/557 X

FOREIGN PATENT DOCUMENTS 588397  2/1959  Italy ................................... 98/40 V
1564551  4/1980  United Kingdom ............... 98/40 N Primary Examiner—William E. Wayner
Assistant Examiner—Harold Joyce
Attorney, Agent, or Firm—John J. Roethel; Daniel M. Stock; Clifford L. Sadler

[57] ABSTRACT

A ventilator grill for a motor vehicle interior comprises a front plate fixed to a fascia panel parallel rear plate movable relative thereto and connected to a ventilation hose. The front and rear plates define two arrays of apertures and are spaced apart by a set of tubes, the ends of which are pivotable in the apertures. The back plate may be moved by a control knob projecting through an aperture in the front plate so that the direction of the air stream from the grill can be varied.

13 Claims, 4 Drawing Figures

VENTILATOR GRILL

BACKGROUND OF THE INVENTION

This invention relates to ventilator grills. A simple form of grill comprises a plate defining an array of apertures thrugh which air can pass. In a motor vehicle, it is desirable that the occupant be able to control the direction of the flow of air through the grill. There have been many proposals for devices for controlling the flow of air through a ventilator grill. For example, in one such device the grill includes a set of parallel louvres mounted in an aperture in a dashboard and coupled together in a gang so that the occupant can alter the angular orientation of the louvres relative to the aperture. This arrangement suffers from the disadvantage that the louvres are visible to the occupant and interrupt the contours of the dashboard.

SUMMARY OF THE INVENTION

According to the present invention, there is provided a ventilator grill comprising a front plate defining an array of apertures characterized by a back plate disposed in a parallel relationship with the front plate, and also defining an array of apertures, a plurality of adjacent aligned tubes, each end of which registers with a respective aperture in each of the plates to conduct air therebetween, and means for moving one of the plates relative to the other while retaining their parallel disposition, each end of each tube being pivotable relative to the aperture with which it registers.

Since the ends of the tubes are pivotable relative to the apertures with which they register, movement of one plate relative to the other alters the orientation of the tubes so that the direction of the flow of air through the grill is altered. In addition, the only part of the grill which is visible to the occupant of the car will be the front plate. This can easily be incorporated in the dashboard or elsewhere in a manner which does not interrupt the contours of the dashboard or other fascia panel.

The ends of the tubes may be pivotable about a single axis so that the direction of flow of air through the grill may be varied in one direction only, e.g., from side to side. Preferably, however, the ends of the tubes are universally pivotable so that the flow of air may be varied in two mutually perpendicular directions.

The pivotal movement of the tubes is conveniently achieved by providing an arcuate bearing surface on each end of the tubes which engages a corresponding surface adjacent the aperture with which the end of the tube registers. For example, where the tubes are universally pivotable, the ends of the tube may be provided with spherical bearing surfaces which engage with the edges of circular apertures in the front and back plates. The bearing surfaces are preferably formed by partitions extending radially across the tube and having end surfaces which lie in the bearing surface.

The ends of the tube may be retained in registry with the apertures by a physical interconnection with the plate, for example, as ball and socket joints. A simpler construction can be achieved if biasing means is provided urging the two plates towards each other so that the ends of the tubes are held in registry with the apertures by the compressive force exerted by the biasing means.

The tubes are preferably interconnected so that they are retained in alignment, thereby facilitating assembly of the grill. For example, the tubes may be embedded in a body of resiliently deformable material, e.g., a foamed plastics material. Alternatively, each tube may be interconnected to its neighboring tubes by integrally molded hinges.

Any suitable mechanism may be provided for causing relative movement between the plates. In the preferred embodiment of this invention, the plates are movable by a control disposed in alignment with the tubes and pivotally engaged at each end with the plates, part of the control member extending through an aperture in the front plate for movement by an operator.

DESCRIPTION OF THE DRAWINGS

A preferred embodiment of this invention will not be described, by way of example only, with reference to the drawings, in which.

DETAILED DESCRIPTION OF THE INVENTION

Figure 1:
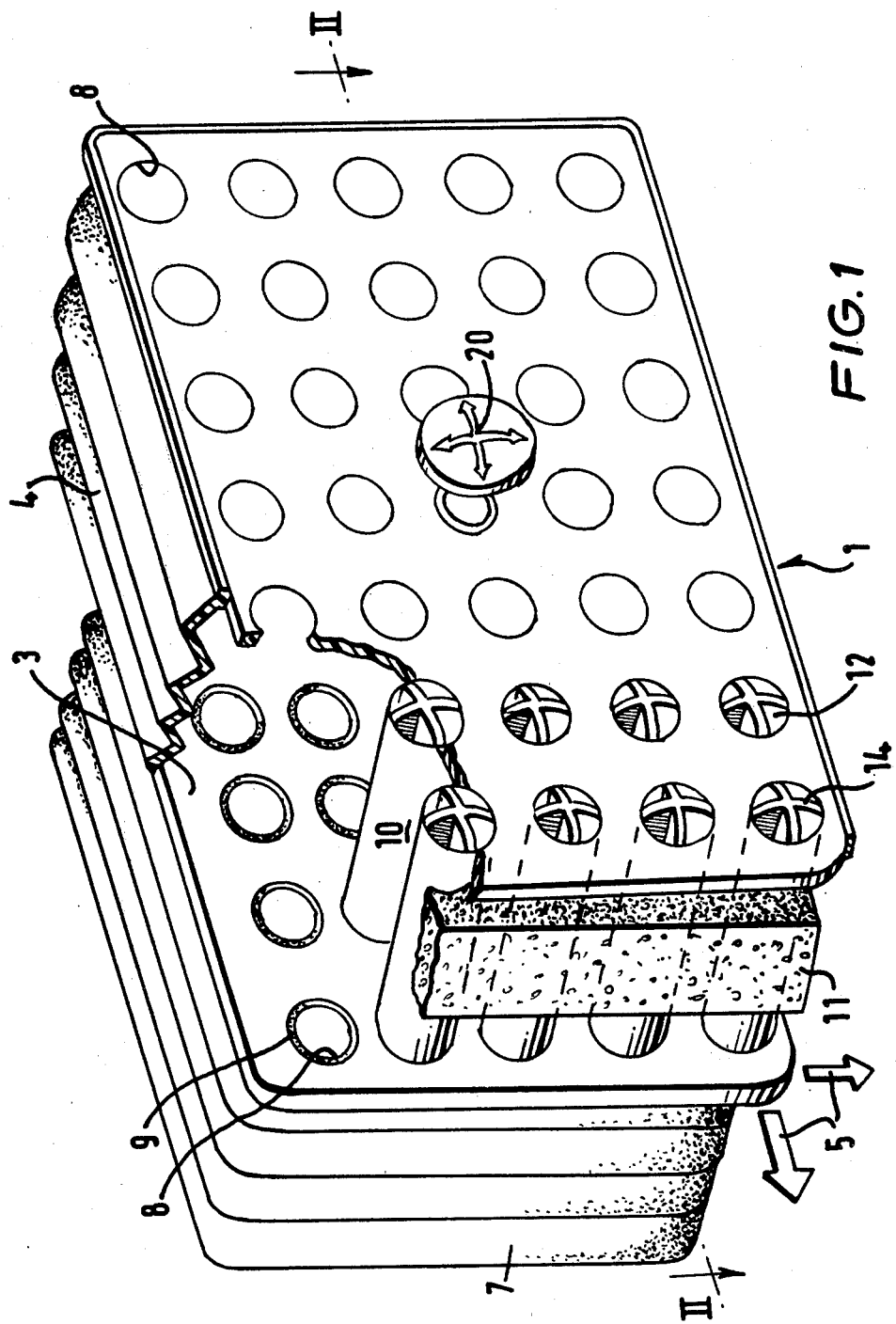
FIG. 1 is a perspective view of a ventilator grill in accordance with the invention, partly broken away to reveal its interior.
Figure 2:
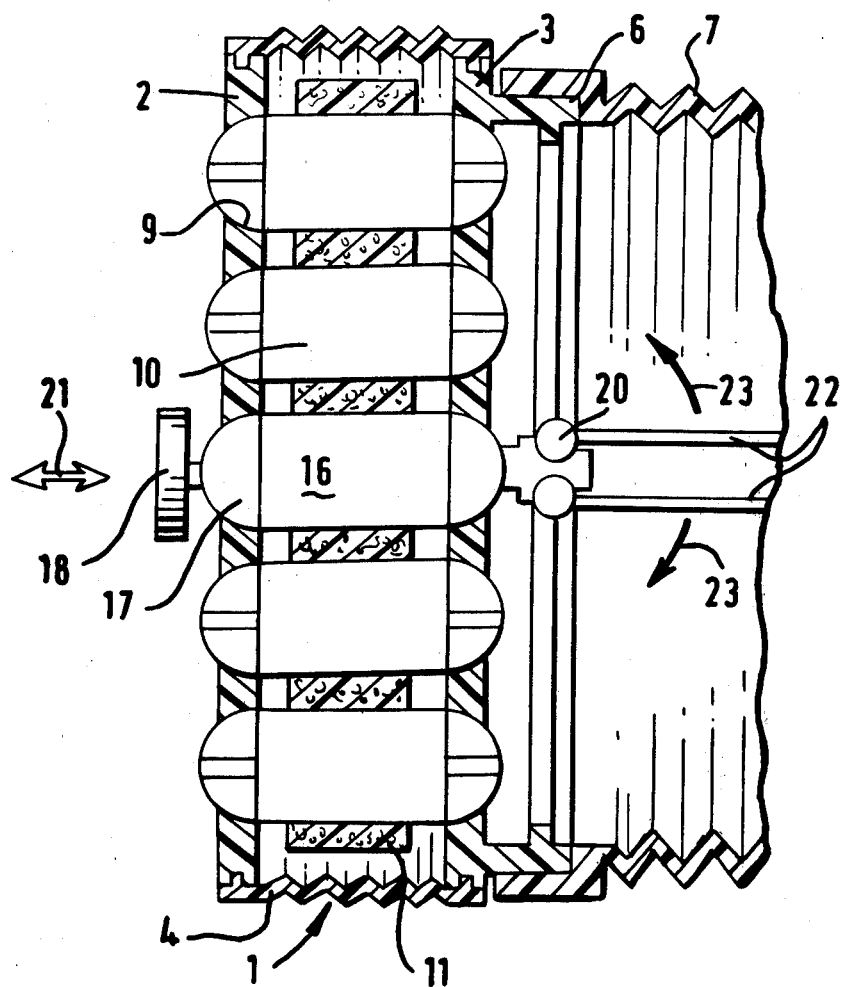
FIG. 2 is a cross-section through the grill of FIG. 1 taken along line II—II.

Referring to FIGS. 1 and 2 of the drawings, a ventilator grill 1 for a motor vehicle interior comprises a front plate 2 which is fixed to a fascia panel and a rear plate 3 connected to the front plate by a flexible boot 4. The boot 4 holds the two plates 2, 3 in parallel relationship but allows the rear plate 3 to move in the two mutually perpendicular directions indicated by the arrows 5 (FIG. 1) relative to the front grill while maintaining the parallel disposition of the plates. The boot 4 incorporates a spring (not shown) which biases the rear plate 3 towards the front plate. The rear face of the rear plate 3 carries a mounting flange 6 by means of which the gill is connected to a flexible ventilation hose 7.

Each plate 2,3 defines a rectangular array of equally spaced apertures 8,8. As best seen in FIG. 2, the edge of each aperture 8 on the inner side of the plate 2,3 is chamfered to form a spherical bearing surface 9,9.

Between the two plates is positioned a set of identical tubes 10 held together by a flexible block 11 of foamed plastics material which retains the tubes in parallel alignment. The tubes 10 are positioned between the two plates 2,3 with their ends in registry with opposite apertures 8 in the plates so that they can each direct a stream of air from the ventilation hose 7 through the front plate 2.

Figure 3:
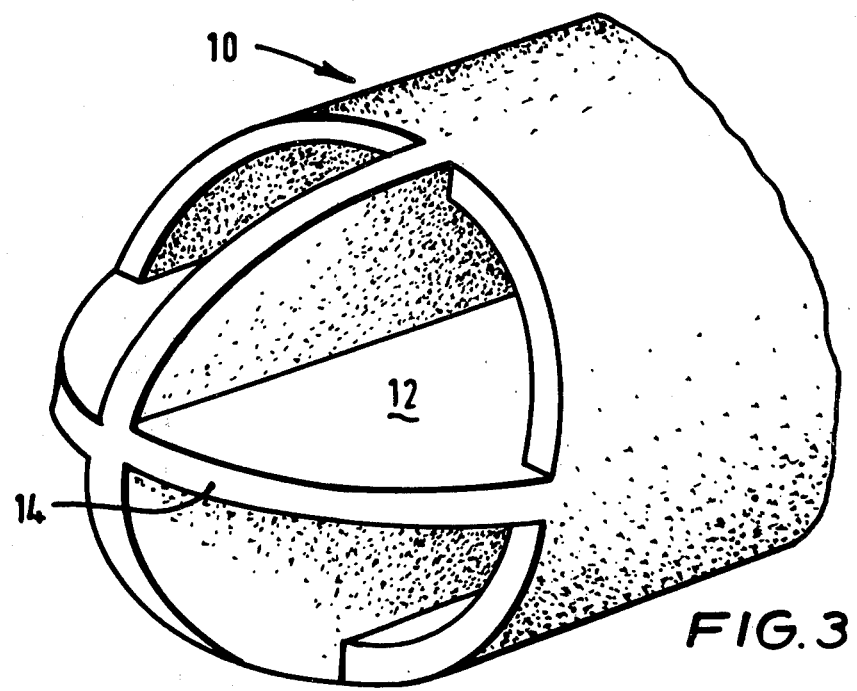
FIG. 3 is a perspective view of part of a tube used in the grill of FIGS. 1 and 2.

As is best illustrated in FIG. 3, each tube 10 includes four partitions 12 which extend radially across the tube along the whole of its length. The terminal edges 14 of the partitions are quarter circular in shape and lie in a common cylindrical surface complementary in shape to the bearing surfaces 9 of the apertures 8 in the front and rear plates 2,3. The ends of the tubes 10 can therefore pivot universally with respect to the apertures 8 in the plate 2 or 3 with which they register.

A cylindrical control member 16 (FIG. 2), of similar shape and size to the tubes 10, and having hemispherical ends 17, is mounted in the center of the set of tubes in alignment with the tubes 10 so that its ends 17 register with the central apertures 8 in the front and rear plates 2,3. A control knob 18, attached to one end of the control member 16, projects through the aperture 8 and can be grasped by the operator. Movement of the control member 16 in the directions indicated by the arrow 20 in FIG. 1 causes a corresponding movement of the back plate 3. This in turn causes the tubes 10 to pivot in the apertures 8, thereby altering the direction in which they direct air from the ventilation hose 7 through the grill 1.

The control member 16 also carries on its inner end a butterfly flap assembly 20, of conventional construction, which is operated by moving the control knob 18 axially relative to the control member 16, as indicated by the arrow 21 in FIG. 2. When the knob control hand 18 is pushed towards the control member 16, the flaps 22 of the flap assembly move in the direction of the arrows 23 in FIG. 2 to close the grill 1 from the ventilation hose 7. Alternatively, the flap assembly 20 may be operated by a separate control.

Figure 4:
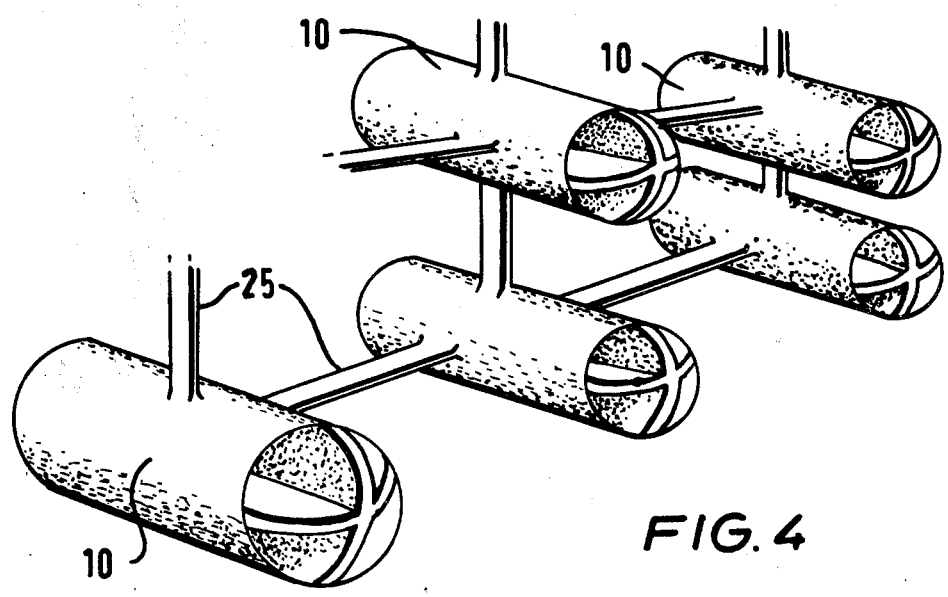
FIG. 4 is a perspective view of part of an alternative construction for the ventilation grill.

As alternative construction for the set of tubes 10 is illustrated in FIG. 4. In this case, the block 11 of foamed plastics material is dispensed with and each tube 10 is connected to its neighbors by hinges 25 of plastics material molded integrally with the tubes 10.

I claim:

1. A ventilator grill comprising a front plate defining an array of apertures characterized by a back plate disposed in a parallel relationship with the front plate, and also defining an array of apertures, a plurality of adjacent aligned tubes, each end of which registers with a respective aperture in each of the plates to conduct air therebetween, and means for moving one of the plates relative to the other while retaining their parallel disposition, the ends of each tube being pivotable relative to the aperture with which it registers in free sliding engagement with the peripheral surface thereof.

2. A grill according to claim 1, wherein the ends of each tube are universally pivotable.

3. A grill according to claim 2, wherein the ends of each tube each include an arcuate bearing surface.

4. A grill according to claim 3, wherein the said bearing surface is hemispherical.

5. A grill according to claim 3, wherein the end of each tube includes partitions which extend radially across the tube and the terminal edges of which lie in the arcuate surface.

6. A grill according to claim 5, comprising biasing means urging the two plates toward each other.

7. A grill according to claim 6, further comprising means interconnecting the tubes to retain the tubes in alignment.

8. A grill according to claim 7, wherein the means interconnecting the tubes combines a body of resilient deformable material through which the tubes extend.

9. A grill according to claim 7, wherein the means interconnecting the tubes comprises a plurality of hinges connecting each tube to neighboring tubes.

10. A grill according to claim 8, wherein the plates are movable by a control member disposed in alignment with the tubes and pivotally engaged, attached at each end with both plates and extending through an aperture in the front plate.

11. A grill according to claim 1, wherein the ends of each tube each include an arcuate bearing surface.

12. A grill according to claim 1, comprising biasing means urging the two plates toward each other.

13. A grill according to claim 1, further comprising means interconnecting the tubes to retain the tubes in alignment.

* * * * *